United States Patent [19]

Hayashi et al.

[11] Patent Number: 5,643,979

[45] Date of Patent: Jul. 1, 1997

[54] BELLOWS-TYPE RUBBER HOSES FOR USE IN AUTOMOBILES

[75] Inventors: Hidenori Hayashi, Aichi-ken; Takao Mizuta, Kawasaki; Ichiro Sagae, Kawasaki; Naotoshi Watanabe, Tokyo, all of Japan

[73] Assignees: Toyoda Gosei Co., Ltd., Nishikasugai-gun; Showa Denko K.K., Tokyo, both of Japan

[21] Appl. No.: 361,309

[22] Filed: Dec. 20, 1994

[30] Foreign Application Priority Data

Dec. 21, 1993 [JP] Japan .................... 5-321444

[51] Int. Cl.$^6$ .................................... C08K 5/34
[52] U.S. Cl. .................... 524/100; 524/83; 524/368; 524/436
[58] Field of Search ............ 524/83, 100, 368, 524/436

[56] References Cited

U.S. PATENT DOCUMENTS

| | | | |
|---|---|---|---|
| 4,558,102 | 12/1985 | Miyata | 525/348 |
| 4,722,959 | 2/1988 | Inoue et al. | 524/412 |
| 4,822,654 | 4/1989 | Takemura et al. | 428/36.8 |
| 4,845,146 | 7/1989 | Inoue et al. | 524/436 |
| 4,988,548 | 1/1991 | Takemura et al. | 428/368 |
| 5,280,083 | 1/1994 | Forste et al. | 525/369 |

FOREIGN PATENT DOCUMENTS

| | | |
|---|---|---|
| 63-154758 | 6/1988 | Japan . |
| 63-230753 | 9/1988 | Japan . |

*Primary Examiner*—Kriellion S. Morgan
*Attorney, Agent, or Firm*—Cushman, Darby & Cushman IP Group of Pillsbury Madison & Sutro LLP

[57] ABSTRACT

A novel rubber composition is disclosed for use in the preparation of bellows-type rubber hoses for installation in automobile engine compartments. The rubber composition of the present invention contains a chlorinated ethylene-propylene copolymer as base rubber, a triazine-based vulcanizing agent, an acid-acceptor comprising magnesium oxide and hydrotalcite, a sulfur-containing organic carboxylic acid releasing enhancer, and a thioether-based antioxidant heat resistance enhancer. The disclosed bellows-type rubber hoses exhibit excellent heat and ozone resistance, sufficient rigidity to permit a reduction in wall thickness in order to withstand negative pressures associated with automobile engine environments and are amenable to molding with limited impact on releasing characteristics.

8 Claims, 1 Drawing Sheet

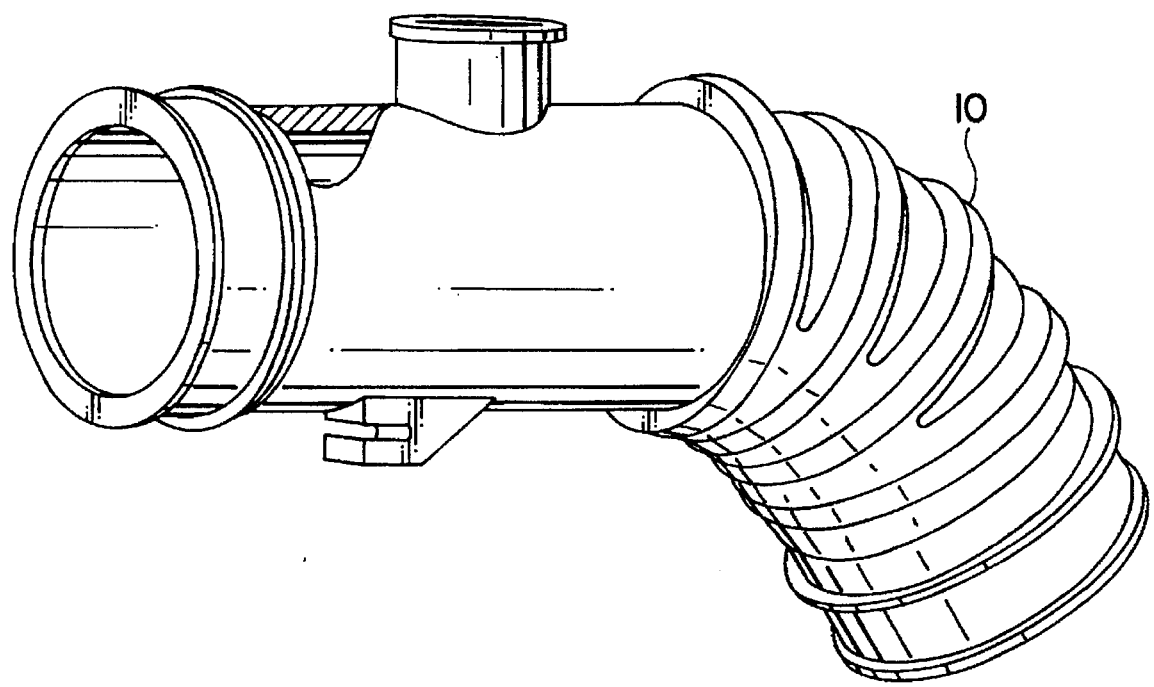

BELLOWS-TYPE RUBBER HOSES FOR USE IN AUTOMOBILES

CROSS-REFERENCE

The present application relies for priority upon the inventors' Japanese Patent Application No. 05-321444 filed Dec. 21, 1993, the content of which is herein incorporated by reference.

FIELD OF THE INVENTION

The present invention relates to bellows-type rubber hoses that are designed for use in automobiles and are prepared by injection molding rubber compositions. More particularly, the rubber hoses of the present invention are intended for use as air hoses in automotive engine compartments and must be capable of resisting the extreme temperatures and negative pressures associated with an automotive engine environment.

BACKGROUND OF THE INVENTION

The need for automotive air hoses having improved resistance to the high temperatures experienced in an engine compartment has been exacerbated by an increase in the number of parts and fixtures restricting the available space in automotive engine compartments. Many of these additional engine components are designed to satisfy the emissions regulations of various governmental authorities. Adding to the problem has been the need to reduce the wall thickness of automotive air in order to enhance resistance to negative pressure, a problem experienced in efforts to reduce the weight and size of automobiles.

Traditionally, materials such as chloroprene rubber (CR) and epichlorohydrin rubber (ECO) have been employed in the manufacture of bellows-type rubber hoses for use in automobiles. These materials have proved unsatisfactory in meeting the requirements of contemporary automotive engine compartments. CR, for instance, exhibits poor resistance to heat and ozone, and its lack of rigidity does not make CR conductive to reductions in hose wall thickness for purposes of enhancing negative pressure resistance. ECO, on the other hand, has better resistance to heat than CR, but its insubstantial rigidity is not amendable to necessary reductions in hose wall thickness. Additionally, ECO is considered to be an expensive polymer material by skilled artisans.

The present invention provides a composition possessing the following features: (1) exceptional heat and ozone resistance; (2) sufficient rigidity to permit reductions in hose wall thickness for purposes of enhancing resistance to negative pressure; and (3) limiting the impact on releasing characteristics when the present composition is molded. The compositions of the present invention are preferably used in the manufacture of bellows-type rubber hoses for use in automobiles.

SUMMARY OF THE INVENTION

The present invention relates to an injection molding composition comprising a chlorinated ethylene-propylene copolymer, a triazine-based vulcanizing agent, an acid-acceptor comprising magnesium oxide and hydrotalcite, a releasing enhancer comprising a sulfur-containing organic carboxylic acid compound, and a heat resistance enhancer comprising a thioether-based antioxidant.

The present invention further relates to an injection molded bellows-type rubber hose for use in automobiles comprising a vulcanized rubber obtained from a chlorinated ethylene-propylene copolymer, which constitutes the rubber material, and a triazine-based vulcanizing agent, an acid-acceptor comprising magnesium oxide and hydrotalcite, a releasing enhancer comprising a sulfur-containing organic carboxylic acid compound, and a heat resistance enhancer comprising a thioether-based anti-oxidant.

BRIEF DESCRIPTION OF THE DRAWING

The drawing shows an automotive air hose of the present invention with the bellows feature.

DETAILED DESCRIPTION OF THE INVENTION

The rubber compositions of the present invention are essentially comprised of a triazine-based vulcanizing agent and a chlorinated ethylene-propylene copolymer as the base rubber. The chlorinated ethylene-propylene copolymer of the present invention can be vulcanized with a triazine-based vulcanizing agent using conventional methods.

Preferred chlorinated ethylene-propylene copolymers of the present invention have a chlorine content of 20–45% by weight, a Mooney viscosity ($ML_{1+4, 100°}$ C.) of 10–150, and are produced by chlorinating ethylene-propylene copolymers having a propylene content of 15–40% by weight and a melt flow index of 0.01–5.0 g/10 min, such as JP-A-63-154758 and JP-A-63-230753 disclose. The most preferred chlorinated ethylene-propylene copolymers of the present invention have a chlorine content of 25–42% by weight, a Mooney viscosity ($ML_{1+4}$, 100° C.) of 15–100 and are obtained by chlorinating ethylene-propylene copolymers having a propylene content of 20–38% by weight and a melt flow index of 0.05–5.0 g/10 min.

The triazine-based vulcanizing agents of the present invention are represented by Formula (A):

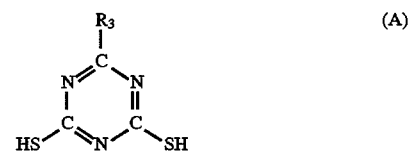

(A)

wherein $R_3$ is a group selected from the group consisting of a mecarpto group and an amino group. Triazine-based vulcanizing agents of Formula (A) are disclosed in JP-A-63-154758 and JP-A-63-230753.

The triazine-based vulcanizing agents of the present invention can be used in combination with a thiourea-based vulcanization accelerator, as represented by either Formula (B) or (C):

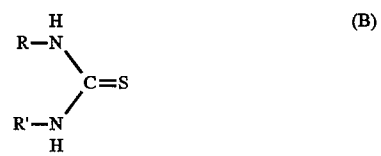

(B)

wherein R and R' can be the same or different, and each of R and R' represents a $C_1$–$C_{18}$ alkyl group, a $C_1$–$C_{18}$ cycloalkyl group or a $C_1$–$C_{18}$ alkynyl group;

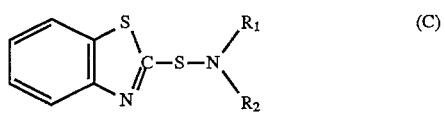

(C)

wherein $R_1$ and $R_2$ can be the same or different, and each of $R_1$ and $R_2$ represents a $C_1$–$C_{18}$ alkyl group, a $C_1$–$C_{18}$ cycloalkyl group, a $C_1$–$C_{18}$ alkynyl group. $R_1$ and $R_2$ can likewise be combined to form a hydrocarbon ring, or $R_1$ and $R_2$ can be bonded to each other through a hetero atom to form a heterocyclic ring. The hydrocarbon ring includes piperidine and pipecoline. The hetero atom includes N, O, S, P and the like. The heterocyclic ring includes morpholine and piperazine.

Salts of mercaptothiazoles and secondary amines such as, for example, a dicyclohexylamine salt of 2-mercaptobenzothiazole, can also be used with the triazine-based vulcanizing agents of the present invention as vulcanization accelerators.

Rubber compositions of the present invention can further be blended with auxiliary components such as, for example, carbon black, a low-temperature plasticizer, a processing aid, a carbon black dispersant, an anti-aging agent and/or white filler.

The carbon black of the present invention is preferably SRF, which corresponds to N700 of ASTM code, or an SRF/MAF, which MAF corresponds to N500 of ASTM code. These carbon black components are desirable because they exhibit superior balance between modulus, tensile strength ($T_B$), elongation ($E_s$) and tear strength ($T_R$). SRF and SRF/MAF further generate limited heat during kneading. Unlimited heat results in poor dispersing characteristics in the rubber compositions because of the deterioration of material scorch and shearing properties. High-structure-type carbon blacks, which cause much aggregation of particles through chemical or physical bonding, are unfavorable for use in the present invention because they generate excessive heat and have poor dispersing characteristics.

The amount of carbon black blended in the present invention is preferably 50–120 phr (phr=parts per 100 parts rubber), and more preferably 60–100 phr when SRF is used. As excess of carbon black will impact negatively on the dispersing properties of the composition, thereby reducing the resistance of the resulting product to fatigue.

A low-temperature plasticizer can be used in the present invention to improve the low-temperature resistance of molded products. For the primary plasticizer, it is desirable to use a plasticizer having a low solidifying point such as, for example, dioctyl sebacate (DOS) or dioctyl phthalate (EOP). DOS and DOP both have solidifying points below −35° C.

Because the use of only one such primary plasticizer tends to cause heat loss during the vulcanization and molding processes, the inventors recommend using a secondary polymerizable plasticizer having a low volatilite, such as, for example, a polyester-type or polyether-type polymerizable plasticizer. The amount of secondary plasticizer is preferably 5–150% by weight based on the primary plasticizer.

The amount of low-temperature plasticizer blended is preferably 5–30 phr, and more preferably 7–20 phr. If an excess of plasticizer is added, it may bleed to the vulcanized surface, potentially causing a reduction in the hardness and modulus of the resulting product.

The acid-acceptor of the present invention is a combination of magnesium oxide (MgO) and hydrotalcite. The acid-acceptor operates to capture the chlorine, which is eliminated from the chlorinated ethylene-propylene copolymer during the vulcanization process.

When MgO is used in the absence of hydrotalcite, problems in heat resistance and releasing characteristics tend to arise. And, when hydrotalcite is used alone, the vulcanization rate decreases and the crosslinking in the vulcanization does not advance smoothly. However, the combined use of MgO and hydrotalcite as acid acceptor for the chlorinated ethylene-propylene copolymer can provide a molding composition having excellent heat resistance properties and possessing exceptional rigidity and releasing characteristics. The bellows-type rubber hoses produced from the compositions of the present invention demonstrate the advantageous properties described above.

Hydrotalcite is commercially available under the trade names of, for example, "DHT-4C" and "KW-2200" (both products of Kyowa Chemical Co., Ltd.) as preferred sources.

The total amount of acid acceptor used in the present invention is preferably between 5–15 phr, and more preferably between 8–12 phr. The MgO/hydrotalcite ratio is preferably from 7:3 to 5:5. An excess of hydrotalcite will tend to adversely affect in the vulcanization process.

According to the present invention, a sulfur-containing organic carboxylic acid compound is used to enhance releasing characteristics, and a thioether-based antioxidant is added to enhance heat resistance.

An example of a sulfur-containing organic carboxylic acid compound that can be used in the present invention is β-($C_1$–$C_{14}$ alkyl)thiopropionic acid, which is commercially available under the trade name of, for example, "ADEKASTAB MA-240" produced by Asahi Electro-Chemical Co., Ltd.) as a preferred source.

The amount of the sulfur-containing organic carboxylic acid compound used in the present invention is preferably 2–10 phr, and more preferably 4–6 phr. Using an excess of this compound can lead to a reduction in dispersing properties, which can reduce the fatigue resistance of the vulcanizate and cause an imbalance among such product properties as modulus, tensile strength, elongation and tear strength.

A preferred example of the thioether-based antioxidants that can be used in the present invention is bis(2-methyl-4-(3-n-($C_{12}$–$C_{14}$alkyl)thiopropionyloxy)-5- t-butylphenylenepropylene) sulfide, which is commercially available under the trade name of, for example, "ADEKASTAB AO-23" (produced by Asahi Electro-Chemical Co., Ltd.). An aminoketone-type or a benzimidazole-type antiaging agent can be used in combination with the thioether-based antioxidant of the present invention for further improvement to the heat resistance of the molded product. The aminoketone-type antiaging agent can be, for example, trimethyldihydroquinoline, and the benzimidazole-type antiaging agent can be, for example, 2-mercapto-benzimidazole, or its zinc salt.

Thioether-based antioxidants of the present invention greatly improve the heat resistance of bellows-type rubber hose intended for use in automobiles. The amount of thioether-based antioxidant used in the present invention is preferably 2–10 phr, and more preferably 4–6 phr. When the thioether-based antioxidant is present in excess to improve the heat resistance, however, the low-temperature resistance of the molded product becomes rather poor, and a portion of the compound may bleed to the surface of the vulcanizate.

A bellows-type rubber hose 10 of the present invention is produced by the conventional injection molding and vulcanizing the composition of the present invention. Injection molding and vulcanization are typically carried out at substantially the same time and preferably under the following conditions: (1) an injection cylinder temperature of 40–80° C.; (2) an injection pressure of 9.8–49.0 MPa (100–500 kg/cm$^2$); (3) a mold temperature of 160–200° C.; and (4) a vulcanizing time of 2–10 min.

The composition of the present invention is prepared by mixing a triazine-based vulcanizing agent, a specific acid-acceptor, a compound to enhance release 5 and a heat resistance plasticizer in a chlorinated ethylene-propylene copolymer. The bellows-type rubber hose produced from composition of the present invention possesses excellent heat and ozone resistance, sufficient rigidity to permit a reduction in wall thickness in order to withstand negative pressures, as required in the art, and capable of being molded with limited impact on releasing characteristics.

EXAMPLE

The present invention is exemplified by the following non-limiting example.

Automotive air hoses of the type shown in the drawing were injection-molded using the chlorinated ethylene-propylene copolymer compounds of the formulations shown in Table 1 as the Example and Comparative Examples and the CR and ECO compounds of the following formulations as reference. An injection temperature of 175° C. was employed. With respect to vulcanizing conditions, two ways of heating temperature and time shown in the row of moldability in Table 2 were followed.

| CR FORMULATION | |
|---|---|
| Neoprene W | 100 parts |
| MAF black | 60 parts |
| Magnesium oxide | 5 parts |
| Stearic acid | 2 parts |
| Zinc oxide | 5 parts |
| Thiourea-based vulcanization accelerator | 3 parts |
| Vegetable oil-based plasticizer | 20 parts |

| ECO FORMULATION | |
|---|---|
| Hydrin 3102L | 100 parts |
| MAF black | 60 parts |
| Fatty acid ester-based plasticizer | 20 parts |
| Stearic acid | 2 parts |
| Triazine-based vulcanizing agent | 2 parts |

Releasing characteristics of the molded products from a mold were evaluated according to the following criterion:

o: No cracks observed in the molded product.

Δ: No cracks observed in the molded product when the release process was carried out slowly.

x: The molded product could not be released. (The product possessed cracks even when the releasing process was carried out slowly).

A test specimen was selected from each of the molded products (molded at 175° C. for 5 min) and subjected to the tests shown in Table 2. Each test was conducted according to JIS K 6301.

The test results of Table 2 demonstrate that the product produced in accordance with the present invention has remarkably improved heat resistance and strength properties when compared with moldings produced from either CR or ECO. Example 1 also exhibited no problems in releasing characteristics.

The products of Comparative Examples 1 and 2 of Table 2 possessed no releasing enhancer and demonstrated problems in moldability. The product of Comparative Example 3 contained no heat-resistance plasticizer and showed poor heat resistance. And with the peroxide-vulcanized-type compound of Comparative Example 4, it was nearly impossible to achieve sufficient rigidity to reduce the wall thickness of the molding product.

TABLE 1

| | | Comparative Examples | | | |
|---|---|---|---|---|---|
| Formulation | Example | 1 | 2 | 3 | 4 |
| Polymer A | 100 | 100 | 100 | 100 | — |
| Polymer B | — | — | — | — | 100 |
| Carbon SRF | 80 | 80 | 80 | 80 | 80 |
| Primary plasticizer | 10 | 20 | 20 | 10 | 20 |
| Secondary plasticizer | 10 | — | — | 10 | — |
| Magnesium Oxide | 6 | 6 | 10 | 6 | 10 |
| Hydrotalcite Compound | 4 | 4 | — | 4 | — |
| Stearic acid | 5 | 5 | 5 | 5 | 5 |
| Sulfur-containing organic carboxylic acid | 5 | — | — | 5 | — |
| Thioether-based antioxidant | 5 | 5 | 5 | — | — |
| Vulcanizing agent A | 5 | 5 | 5 | 5 | — |
| Vulcanizing agent B | — | — | — | — | 13 |

Polymer A: Chlorinated ethylene-propylene copolymer (chlorine content = 30%; Mooney viscosity = 100)

Polymer B: Chlorinated ethylene-propylene copolymer (chlorine content = 30%; Mooney Viscosity = 80)

Carbon: SRF (Seast GS produced by TOKAI CARBON CO., LTD.)

Primary plasticizer: DOS (dibutyl sebacate produced by DAIHACHI CHEMICAL INDUSTRY CO., LTD.)

Secondary plasticizer: "ADEKACIZER PN-160" (an adipate-containing polyester), a polymerizable plasticizer produced by Asahi Electro-Chemical Co., Ltd.

MgO: "KYOWAMAG 60"

Hydrotalcite compound: "DHT-4C", produced by Kyowa Chemical Co., Ltd.

Stearic Acid: A product by KAO CORPORATION.

Sulfur-containing organic carboxylic acid: "ADEKASTAB MA-240" produced by Asahi Electro-Chemical Co., Ltd.

Thioether-based antioxidant: "ADEKASTAB AO-23", produced by Asahi Electro-Chemical Co., Ltd.

Vulcanizing agent A: Dicyclohexylamine salt of 2-mercaptobenzothiazole/ trithiocyanuric acid = 3/2

Vulcanizing agent B: PERHEXA V-40 (produced by Nippon Yushi KK)/ triallyl isocyanurate = 10/3

PERHEXA V-40 is mainly composed of n-butyl-4,4-bis(t-butylperoxy) valerate:

$$\text{CH}_3-\underset{\underset{\text{OO}-\text{C}(\text{CH}_3)_3}{|}}{\overset{\overset{\text{OO}-\text{C}(\text{CH}_3)_3}{|}}{\text{C}}}-\text{CH}_2-\text{CH}_2-\overset{\overset{\text{O}}{\|}}{\text{C}}-\text{O}-(\text{CH}_2)_3\text{CH}_3$$

TABLE 2

| Items*Conditions*Properties | CR | ECO | Example 1 | Comp. Example 1 | Comp. Example 2 | Comp. Example 3 | Comp. Example 4 |
|---|---|---|---|---|---|---|---|
| Ordinary-state properties JISK 6301 | | | | | | | |
| $H_S$ (JISA) | 75 | 75 | 80 | 80 | 78 | 80 | 77 |
| $T_B$ (MPa) | 14.0 | 12.0 | 18.0 | 18.5 | 19.7 | 19.5 | 16.5 |
| $E_B$ (%) | 300 | 300 | 260 | 260 | 210 | 250 | 320 |
| $M_{100}$ (MPa) | 5.0 | 5.0 | 8.0 | 9.5 | 10.5 | 8.0 | 5.5 |
| Specific gravity | 1.45 | 1.42 | 1.27 | 1.26 | 1.26 | 1.27 | 1.30 |
| Heat resistance (× 70 h) 130° C. | | | | | | | |
| $\Delta H_S$ | +13 | +6 | +5 | +5 | +5 | — | — |
| $\Delta T_B$ (%) | −26 | +4 | +6 | +6 | +5 | — | — |
| $\Delta E_B$ (%) | −41 | −40 | −20 | −20 | −22 | — | — |
| 140° C. | | | | | | | |
| $\Delta H_S$ | +14 | +10 | +7 | +7 | +8 | +11 | +8 |
| $\Delta T_B$ (%) | −30 | −6 | +6 | +14 | +3 | −8 | +8 |
| $\Delta E_B$ (%) | −70 | −45 | −25 | −28 | −32 | −63 | −10 |
| Compression set (× 70 h) | | | | | | | |
| 100° C. CS (%) | 35 | — | — | — | — | — | — |
| 130° C. CS (%) | 47 | 60 | 50 | 45 | 50 | — | — |
| 140° C. CS (%) | 75 | 80 | 70 | 68 | 65 | 75 | 43 |
| Ozone resistance (cracked or not cracked) | | | | | | | |
| 20%  50 pphm  40° C.  70 h | o | o | o | o | o | o | o |
| 0–30%  50 pphm  40° C.  100 h | x | o | o | o | o | o | o |
| Low temperature properties Low-temperature Embrittlement | | | | | | | |
| All-failure temperature | −40 | — | −38.0 | −39.0 | −39.0 | −39.0 | — |
| No-failure temperature | −35 | — | −32.0 | −36.0 | −37.0 | −37.0 | — |
| Brittle temperature | −37 | — | −35.0 | −36.5 | −38.0 | −38.0 | — |
| Moldability Release characteristics | | | | | | | |
| 170° C., 7 min. | o | — | o | Δ | Δ | o | o |
| 180° C., 5 min. | o | — | o | Δ | Δ | o | o |

While the invention has been described in connection with what is presently considered to be the most practical and preferred embodiment, it is to be understood that the invention is not to be limited to the disclosed embodiment, but on the contrary is intended to cover various modifications and equivalent arrangements included within the spirit and scope of the appended claims.

Thus, it is to be understood that variations in the particular rubber composition, the products moldable therefrom and the applications of such molded products can be made without departing from the novel aspects of the invention as defined in the claims.

What is claimed is:

1. A rubber composition comprising:

a chlorinated ethylene-propylene copolymer;

a triazine-based vulcanizing agent in combination with a salt of a mercaptothiazole and a secondary amine;

an acid-acceptor comprising magnesium oxide and hydrotalcite;

a releasing enhancer comprising a sulfur-containing organic carboxylic acid compound; and a heat resistance enhancer comprising a thioether-based antioxidant.

2. An injection molded bellows-type rubber hose for use in automobiles comprising:

a vulcanized rubber obtained from a chlorinated ethylene-propylene copolymer as base rubber and a triazine-based vulcanizing agent in combination with a salt of a mercaptothiazole and a secondary amine;

an acid-acceptor comprising magnesium oxide and hydrotalcite;

a releasing enhancer comprising a sulfur-containing organic carboxylic acid compound; and a heat resistance enhancer comprising a thioether-based antioxidant.

3. The bellows-type rubber hose according to claim 2, wherein the chlorinated ethylene-propylene copolymer has a propylene content of 15–40% by weight, a chlorine content of 20–45% by weight and a Mooney viscosity ($ML_{1+4}$, 100° C.) of 10–150.

4. The bellows-type rubber hose according to claim 2, wherein the chlorinated ethylene-propylene copolymer has a propylene content of 20–38% by weight, a chlorine content of 25–42% by weight and a Mooney viscosity ($ML_{1+4}$, 100° C.) of 15–100.

5. The bellows-type rubber hose according to claim 2, wherein the triazine-based vulcanizing agent is represented by the following formula:

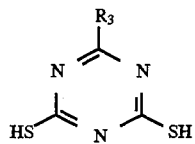

wherein $R_3$ is selected from the group consisting of a mercapto group and an amino group.

6. The bellows-type rubber hose according to claim 2, wherein the sulfur-containing organic carboxylic acid compound is β-alkylthiopropionic acid.

7. The bellows-type rubber hose according to claim 2, wherein the thioether-based antioxidant is bis-(2-methyl-4-(3-n-alkylthiopropionyloxy)-5-t-butylphenylenepropylene) sulfide.

8. The bellows-type rubber hose according to claim 2, wherein the triazine-based vulcanizing agent contains a vulcanization accelerator.

* * * * *